United States Patent [19]

Brown

[11] Patent Number: 4,476,673
[45] Date of Patent: Oct. 16, 1984

[54] SHACKLE PIN LOCKING CONSTRUCTION

[76] Inventor: Ronald T. Brown, 102 Bruno Ave., Pittsburg, Calif. 94565

[21] Appl. No.: 474,507

[22] Filed: Mar. 11, 1983

[51] Int. Cl.³ .............................................. F16G 13/06
[52] U.S. Cl. ....................................... 59/86; 411/121; 411/317
[58] Field of Search ............... 411/121, 315, 316, 317, 411/319, 116, 119, 120, 124, 123, 127; 24/335, 336, 339; 403/155, 154, 320, 316, 231; 59/86

[56] References Cited

U.S. PATENT DOCUMENTS

| | | | |
|---|---|---|---|
| 451,097 | 4/1891 | Wilkinson | 24/339 X |
| 962,733 | 6/1910 | Beltz | 59/86 |
| 1,034,065 | 7/1912 | Binder | 403/231 |
| 1,473,177 | 11/1923 | Coyne | 403/155 X |
| 2,037,736 | 4/1936 | Payne | 403/231 X |
| 3,229,333 | 1/1966 | Hillesheim | 403/231 |
| 3,452,955 | 7/1969 | Hartwig | 24/339 X |
| 3,530,997 | 9/1970 | Djorup | 403/167 X |
| 4,221,252 | 9/1980 | Bruce | 411/317 |
| 4,227,667 | 10/1980 | Dickerson | 24/339 X |
| 4,418,583 | 12/1983 | Taig | 403/320 X |

FOREIGN PATENT DOCUMENTS

| | | | |
|---|---|---|---|
| 109050 | 11/1939 | Australia | 24/339 |
| 960508 | 4/1950 | France | 24/339 |

*Primary Examiner*—Gary L. Smith
*Assistant Examiner*—Adrian H. Whitcomb, Jr.
*Attorney, Agent, or Firm*—Charles E. Temko

[57] ABSTRACT

A resilient clip selectively engaging portions of a loop type shackle, and the removable locking pin therefor to prevent accidental disengagement through loosening of the pin. The clip may be engaged and disengaged without the use of tools, and may be temporarily resiliently attached to the body of the shackle when not in use. The clip includes first and second clip members interconnected at substantially a right angle by a medially positioned neck portion.

4 Claims, 4 Drawing Figures

FIG. 1.
FIG. 2.
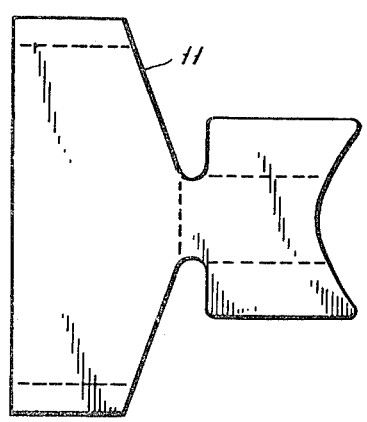
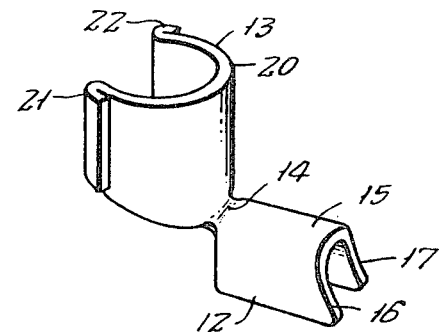
FIG. 3.
FIG. 4.
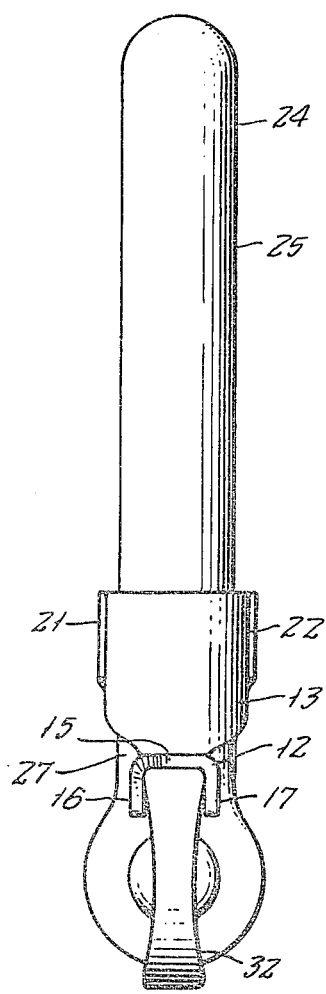
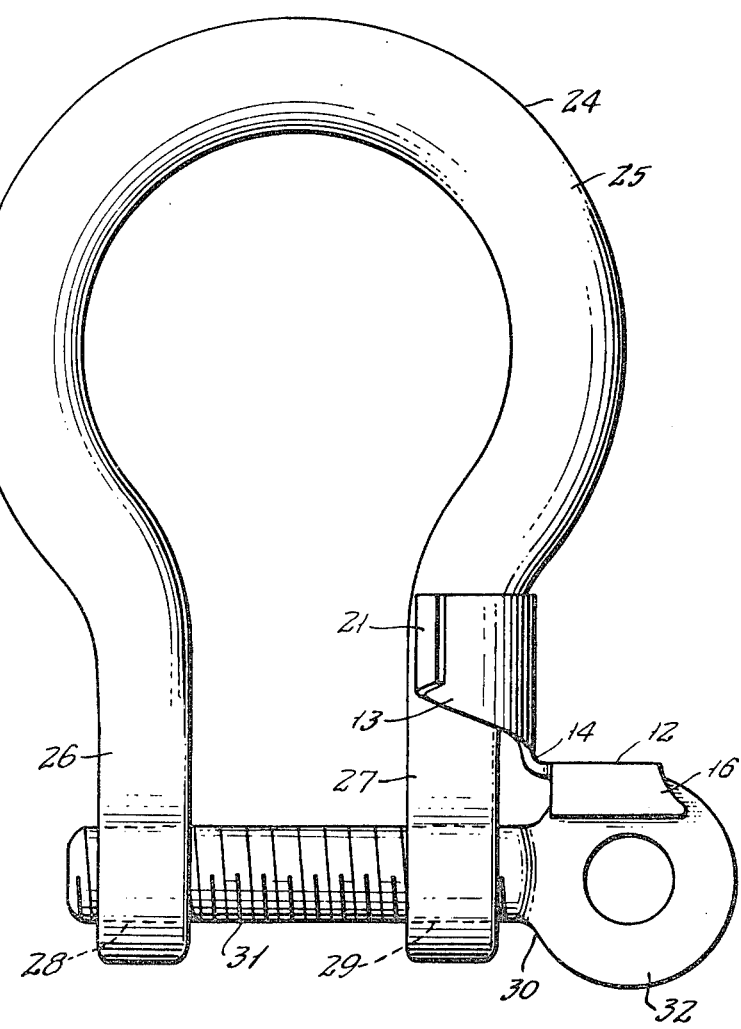

SHACKLE PIN LOCKING CONSTRUCTION

BACKGROUND OF THE INVENTION

This invention relates generally to the field of tackle used for securing ropes and cables in operative position on rigging devices and the like, and more particularly to an improved device for locking a shackle in closed condition by preventing the selectively removable pin from becoming accidentally dislodged.

The classic shackle for this purpose consists of a generally U-shaped member, the free ends of which are provided with coaxially aligned bores accommodating an elongated pin which threadedly engages at least one of the bores and spans the open area between the free ends. In some cases, the pin is provided with a transversely extending bore which accommodates a cotter pin which penetrates the shackle pin to prevent more than a limited degree of movement between the pin and the shackle body. While not without utility, cotter pins are subject to breakage under stress, and, further, they normally require a tool to spread the legs of the pin during engagement, as well as some sort of clamping device to straighten the legs prior to removal.

Safety guards for bolts and the like, are also known in the art. The U.S. Pat. No. 1,303,293 granted to W. Gries describes a safety guard for a bolt affixed in such manner as to not be readily removable. The U.S. Pat. No. 1,550,784 to G. T. Cooke discloses an L-shaped locking menber of sheet metal which is folded about a pin or bolt to be retained. However, such a locking device is for non-repeated use only.

SUMMARY OF THE INVENTION

Briefly stated, the invention contemplates the provision of an improved resilient metallic or synthetic resinous clip, a first element of which is contoured to engage the head portion of the shackle pin, and a second element of which is contoured to engage an adjacent leg portion of the shackle body to prevent rotational and longitudinal movement of the pin relative to the shackle body. The last mentioned portion is provided with conveniently manually engageable structure so that the locking structure can be removed without resort to tools of any kind. The structure may be formed as a single steel stamping of spring or stainless steel, or in the case of relatively smaller sizes, as a synthetic resinous molding.

BRIEF DESCRIPTION OF THE DRAWING

In the drawing, to which reference will be made in the specification, similar reference characters have been employed to designate corresponding parts throughout the several views.

FIG. 1 is a view in elevation of a unitary blank in developed form, from which an embodiment of the invention may be shaped.

FIG. 2 is a view in perspective showing a completed embodiment formed from the blank shown in FIG. 1.

FIG. 3 is a side elevational view showing the embodiment in installed condition on a conventional shackle.

FIG. 4 is a side elevational view thereof, as seen from the left hand portion of FIG. 3.

DETAILED DESCRIPTION OF THE DISCLOSED EMBODIMENT

In accordance with the invention, the device comprises generally a planar metallic stamping 11 (FIG. 1) from which are formed first and second clip members 12 and 13, respectively, separated by an angularly disposed neck portion 14 (see FIGS. 2 and 3).

The first clip member includes a generally planar central portion 15 interconnected with first and second angularly disposed portions 16 and 17, respectively which define a generally planar interstice therebetween.

The second clip member 13 includes an arcuate portion 20 extending over an arc of approximately 270 degrees, and having at either end thereof angularly disposed flanges or coils 21 and 22 to facilitate manual engagement. It will be observed that the clip members 13 and 14 are supported at a mutual right angle by the bent neck portion 14.

Referring to FIGS. 2 and 3, there is illustrated a conventional shackle 24 of a type used for rope and cable rigging. It includes a generally U-shaped main body 25 having first and second free ends 26 and 27, respectively, each of the ends including a threaded coaxially aligned bore at 28 and 29. A locking pin 30 selectively engages the bores, and includes a threaded shank 31 as well as a flattened head member 32 which permits manual tightening, or the engagement of a tool (not shown) for this purpose.

When the pin 30 is engaged within the bores 28 and 29, it is tightened to a degree which permits the flattened head portion 32 to be positioned substantially vertically as seen in FIGS. 2 and 3. At this point, the device is positioned by snapping the first clip member over the head member 32 while simultaneously expanding the arcuate portion 20 of the second clip member over the body of the shackle, past a dead center position wherein it resiliently grips the body to maintain itself in engagement.

To disengage the pin 30, the second clip member may be manually expanded using the portions 20 and 21 until disengagement is accomplished.

If desired, the first clip member may be enlarged, and provided with detents which resiliently engage the sides adjacent the through opening in the head member 32 to provide a more secure engagement with the pin 30.

I wish it to be understood that I do not consider the invention limited to the precise details of structure shown and set forth in this specification, for obvious modifications will occur to those skilled in the art to which the invention pertains.

I claim:

1. A shackle pin locking construction for use with a shackle of a type including a generally U-shaped main body having a pair of free ends, there being an aligned bore in each of said free ends and a pin selectively engaging said bores to span an opening between said free ends, said locking construction including: a unitary body defining first and second clip members, said first clip member having a generally planar central portion and a pair of parallel portions extending therefrom which define a generally planar interstice therebetween; said second clip member including an arcuate portion defining an interstice lying in a generally coplanar relation relative to the interstice formed by said first clip member; an angularly disposed neck portion interconnecting said first and second clip members at substantially a right angle such that the openings to said interstices in said first and second clip members face in mutual diverging relation; and means on said second clip member to facilitate the spreading of the same; whereby said second clip member may selectively engage said body adjacent a free end thereof, and said first clip member may selectively engage a portion of said pin to prevent relative movement between said pin and said body.

2. Shackle pin locking construction as set forth in claim 1, in combination with said shackle.

3. Shackle pin locking construction as set forth in claim 1, further characterized in said construction being formed as a result of a stamping operation from metallic sheet material.

4. Shackle pin locking construction as set forth in claim 1, further characterized in said construction being formed as a molding from synthetic resinous material.

* * * * *